May 11, 1971   C. A. COOK ET AL   3,578,543
SEAL FOR PLASTIC SHEETING
Filed Sept. 28, 1967

United States Patent Office 3,578,543
Patented May 11, 1971

3,578,543
SEAL FOR PLASTIC SHEETING
Charles A. Cook and David H. Campbell, Baton Rouge,
La., assignors to Ethyl Corporation, New York, N.Y.
Filed Sept. 28, 1967, Ser. No. 671,263
Int. Cl. B32b 3/22
U.S. Cl. 161—38                                    5 Claims

ABSTRACT OF THE DISCLOSURE

An overlap seal for joining together two edges of reinforced thermoplastic material. A plurality of strands or bands of hot melt adhesive are applied adjacent the edge of the one sheet of thermoplastic reinforced material and the edge of another sheet is positioned above the first sheet. The sheets are brought together and pressure is applied so that the heat contained in the hot melt adhesive causes a fusion of the two edges of thermoplastic to create a high strength bond. Some of the bands of thermoplastic material flow together to form a wide band with narrower bands on each side to provide an overlapped seal having increased strength.

BACKGROUND OF THE INVENTION

Field of the invention

This invention relates to an overlap seal for securing together two edges of reinforced thermoplastic material using a plurality of bands of hot melt adhesive.

Description of the prior art

In copending patent application S.N. 634,560, now abandoned, filed Apr. 28, 1967, there is disclosed a reinforced plastic material made from two sheets of multilayer thermoplastic film bonded together with a pattern of filament reinforcing material sandwiched between the two layers of thermoplastic film. These sheets of thermoplastic have in some cases been manufactured in approximately six feet and four feet widths. Since these reinforced thermoplastic materials find their greatest use as coverings for greenhouses, temporary buildings, pond liners, tarpaulins for covering materials stored in the open such as lumber, grain, hay, and other articles, it is necessary that the narrower width material be joined together along their longitudinal edge to provide reinforced thermoplastic material having widths suitable for the uses above. The trade requires widths up to thirty feet in one single continuous length.

It is quite common to bond two pieces of thermoplastic material together by application of pressure and heat to fuse the overlapped portions of the material. This has not proved successful in joining two sheets of filament reinforced thermoplastic material because the heat and pressure applied causes a flow of thermoplastic material away from the reinforced material protuberances which extend outwardly from each face of a sheet of reinforced thermoplastic. The reinforcing filamentary material has a thickness normally five to ten times that of the thermoplastic film used to make the laminate. Thus when heat and pressure is applied to the thermoplastic material it is melted away from the top of the strands of reinforcing material providing a weak point in the laminated material over the width of the seal. In U.S. Pat. 3,332,831 there is disclosed a method of providing a seal for reinforced thermoplastic material which utilizes three strips of fusible plastic film, one sandwiched in between the overlapped joint and one applied on each side of the joint. These strips of film are subjected to heat and pressure to bond the thermoplastic strips to the thermoplastic layers of the reinforced material. While this provides a satisfactory seal in many respects it has been found that the application of heat and pressure to a lapped joint of a filament reinforced material produces a brittleness at each edge of the seam caused by crystallinity of the thermoplastic material. This defect is particularly troublesome when low pressure polyethylene is used as the film material for making the laminate. In U.S. Pat. 3,271,223 cylindrical beads of molten thermoplastic resin are applied to the outside wall of plastic sacks to fuse the inner walls of the sack together to produce a seal.

SUMMARY OF THE INVENTION

It is an object of this invention to provide a seal for filament reinforced thermoplastic material having high strength in the seal area.

It is a further object of this invention to provide a seal for filament reinforced thermoplastic material that does not require the addition of heat when pressing the surfaces together.

It is also an object of the present invention to provide a process for effecting an overlap seal between two sheets of filament reinforced thermoplastic material.

It is a still further object of the present invention to provide a process for producing an overlap seal in reinforced thermoplastic material which process is readily carried out by relatively simple equipment.

The foregoing objects as regards the seal in thermoplastic material is realized in an overlapped seal for securing two edges of one or more sheets of a filament reinforced thermoplastic material together by utilizing a plurality of bands of adhesive applied between the overlapped portions of the two edges and bonded thereto. The adhesive is applied initially in a molten state and bonds the sheets together by the application of pressure applied in the absence of any additional heat.

The process aspects of the present invention are carried out by making an overlapped seal between two edges of one or more sheets of filament reinforced plastic material by aligning the two edges of the plastic material in overlapping, spaced apart, parallel relationship. A plurality of bands of adhesive are placed between the overlapped edges of the reinforced plastic material. Pressure is then applied to at least one of the edges to bond the edges together by means of the adhesive. The pressure is applied in the absence of additional heating.

Utilizing a so-called "hot melt" adhesive the joint of the present invention provides extremely high strength without degrading the thermoplastic reinforced material. As pointed out hereinbefore prior art joints necessitated heating the thermoplastic material to fuse them to each other or the application of a separate strip of cold plastic material between the edges and subsequent fusing by heat. Utilizing thermoplastic hot melt adhesive avoids overly heating the reinforced plastic material in the seal area yet provides an integral waterproof seal which has a strength approaching that of the reinforced thermoplastic material without a seal. By using a plurality of independent narrow bands of hot melt adhesive on each side of a central relatively wide band of hot melt adhesive a "graded" seal is provided which has a strength that progressively increases on each side from the outer narrow seals into the center of the central wide seal.

DESCRIPTION OF THE PREFERRED EMBODIMENTS

Figure 1:
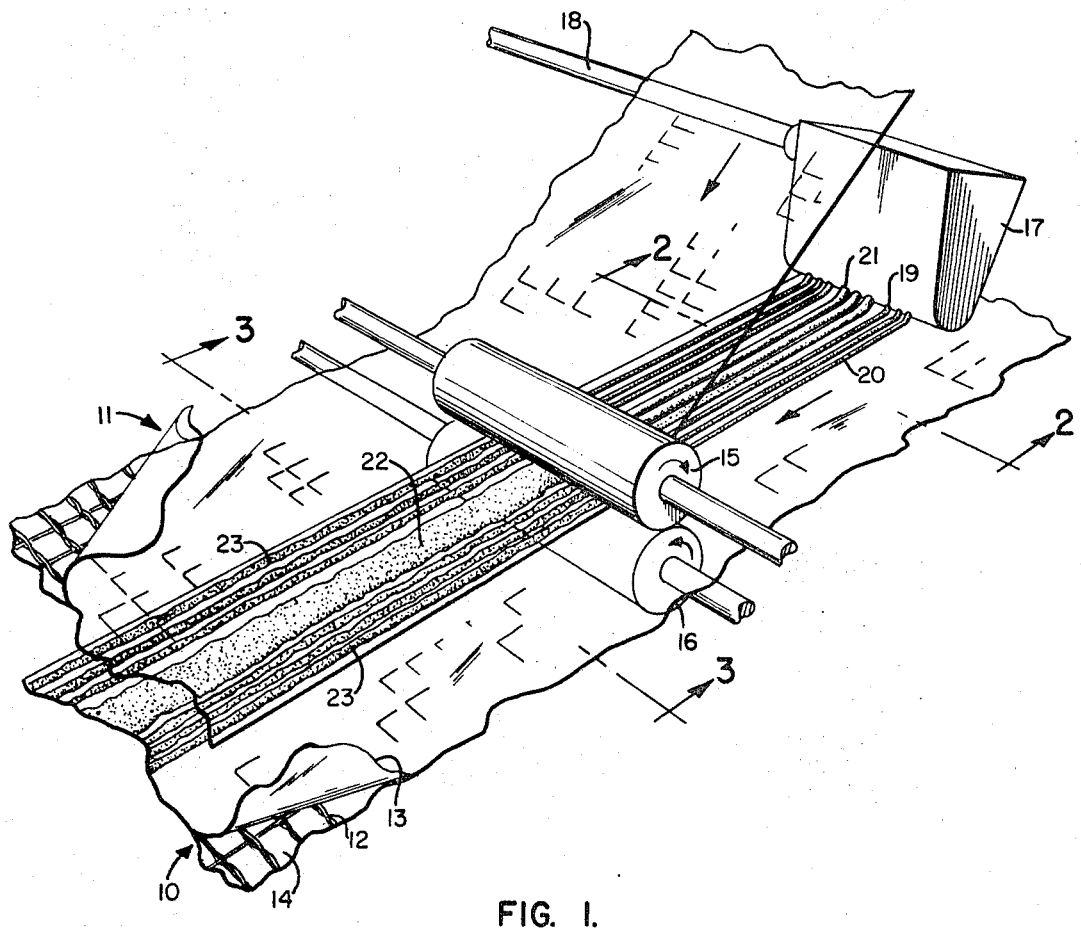
FIG. 1 is a schematic elevation perspective view of two sheets of reinforced thermoplastic material having the seal of the present invention together with an exemplary apparatus that may be utilized in forming the seal.

Referring now to FIG. 1 a lower sheet of thermoplastic material, designated generally by the numeral 10, and an upper sheet of thermoplastic material, designated generally by numeral 11, are sealed together with an overlapped seal. These sheets of reinforced thermoplastic material may be made by the process described in copending application, Ser. No. 634,560, filed Apr. 28, 1967, for "Reinforced Plastic Material." However, it is not necessary that they have the construction described in the aforementioned patent application but may be any plastic material containing a filmentary reinforcing material in which it is desired to achieve a longitudinally extending edge seal. Each sheet of thermoplastic material is shown as being reinforced with a filamentary open mesh scrim material 12. The scrim material is preferably sandwiched between two layers of thermoplastic materials 13 and 14. The sheets of reinforced plastic material may be made by bonding the layers 13 and 14 together with heat or an adhesive may be used therebetween. As mentioned hereinbefore the sheets may be formed by using the coaxially extruded multilayer films disclosed in the aforementioned patent application.

Figure 2:
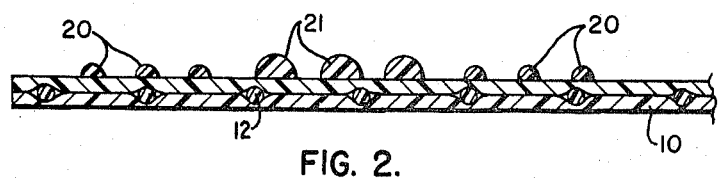
FIG. 2 is an enlarged sectional view along lines 2—2 of FIG. 1.
Figure 3:
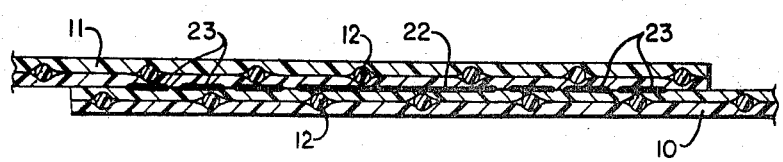
FIG. 3 is an enlarged cross-sectional view of FIG. 1 along the lines 3—3.

The preformed sheets of reinforced plastic material 10 and 11 are stored on delivery rolls (not shown) located at the rear of the seal forming apparatus. The sheets of reinforced plastic material 10 and 11 are pulled off of the storage rolls and drawn through the nip of a pair of pressure rollers 15 and 16. These pressure rollers not supplied with any heat and are operated at ambient temperature. The sheets of reinforced plastic material 10 and 11 are held apart prior to introduction to the nip of the pressure rollers 15 and 16. A distributor head 17 for a molten hot melt adhesive is mounted between the spaced apart reinforced plastic sheets 10 and 11. This distributor is fed by supply line 18 from a tank of molten hot melt adhesive (not shown) or from a screw extruder (not shown) which plastifies and supplies a semimolten hot melt thermoplastic adhesive to the distributor head. The distributor head 17 has a plurality of generally cylindrical shaped openings 19 from which molten strands of hot melt adhesives are extruded. The distributor head openings 19 are two different sizes. Those on the outer extremity being of a smaller diameter than the openings provided in the central portion of the distributor head. While the distributor is shown as providing three smaller diameter strands 20 on each side of three large diameter centrally located strands 21 the invention is not limited to this number of strands of hot melt adhesive. The number of strands of adhesive may be any number provided there is sufficient adhesive applied to the overlapped area of the reinforced thermoplastic to provide a seal having sufficient strength for the intended use of the reinforced thermoplastic material. The thermoplastic hot melt adhesive is layed down by the distributor head on the lower sheet of reinforced plastic 10 in an evenly spaced pattern as can be seen more clearly in FIG. 2. Depending upon the temperature at which the hot melt adhesive is applied to the reinforced sheet material the strands 20 and 21 will retain some of the shape of the orifices from which they are extruded. In the embodiment of the distributor head illustrated the strands are of a generally cylindrical shape although this is not essential to the operation of the invention. The strands may be rectangular or any other shape. The molten strands of adhesive are pressed between the upper sheet of reinforced material 11 and the lower sheet of reinforced material 10 as the overlapped edges of the material passes between the nip of the pressure rollers 15 and 16. After the adhesive has passed through the nip rollers the three center strands of larger diameter 21 are merged together into a single relatively wide central band 22 which fuses to the upper and lower sheets of material 10 and 11 respectively to provide a high strength bond. The smaller strands 20 located to each side of the central band 22 are flattened into narrow bands 23 which do not merge together but retain their integrity. While it is not essential that the sizing and spacing of the orifices 19 provided in the distributor head 17 be so arranged that the outer strands 23 remain separate it is generally preferred that this be the case in order to provide a graded seal from the outer edge of each sheet inwardly to the broad central band 22. In any event the thickness of the hot melt should taper to thin sections on either side of the central band. In this construction when tension is placed on the lapped seam the smaller bands 23 take up the first initial tension forces and are ruptured first thus providing a series of graded seals across the width of the entire lapped seal. One central band of hot melt adhesive does not provide the strength achieved by using a plurality of thin outer bands in conjunction with a thicker inner band. It is believed that the preferred construction provides an area of gradual change in the crystallinity of the plastic material of the laminate resulting in the absence of a sharp line along which the laminated film seals of the prior art made using a heat activated seal were found to fail.

By "hot melt" adhesive is meant any thermoplastic resin base adhesive material which is normally solid at room temperature and is applied as a molten layer without the use of any solvent. Suitable hot melt thermoplastic materials for use in making the seal of the present invention are well known to the trade. One particular material which has been found eminently suitable for use as a hot melt adhesive in effecting the seal of the present invention is an ethylene-vinyl acetate copolymer. Ethylene-vinyl acetate copolymers are commercially produced by a number of companies and one particular material identified as DQDE–1868 (18–20% wt. vinyl acetate) produced by Union Carbide has been found quite suitable. Another suitable Union Carbide resin of their ethylene-vinyl acetate series is DQDA–7268 (about 30% wt. vinyl acetate). Another series of hot melt adhesives that have been found suitable are the copolymers of polyethylene and acrylic acid. Those tested were resins made available by Dow Chemical Company and designated QX–3623.28 and QX–3623.4. These adhesives produced very strong seals and are quite suitable for use in the present invention. Other hot melt adhesives offered to the trade are also suitable, particularly those based on low molecular weight polyethylene compounds. Polyethylene compounds may be used in conjunction with other monomers and other additives which enhance the adhesion between these polymers and the material to be bonded. Additionally hot melt adhesives based on other synthetic resins may be used, e.g., those based on polyester resins (polyethylene terephthalate) and nylon type materials (polyamides). The principal citeria to be observed in choosing a hot melt adhesive is that the adhesive have the ability to effect a strong bond between the two plastic sheets, i.e., it must be compatible with the plastic material from which the sheets are made. It should have a melting point high enough so that sufficient heat is carried by the molten strands to cause them to bond effectively to the plastic sheets under pressure without the use of any additional added heat. It should also be reasonably flexible at normal ambient temperatures, i.e., not crack at winter temperatures or soften excessively at summer temperatures. It is preferred that the adhesive be water insoluble, however hot melts which are not water resistant (such as those based on polyvinyl alcohol) may be used where the laminate will not be exposed to any significant amount of moisture.

The seal made by the apparatus and process described hereinbefore in reinforced thermoplastic material wherein ethylene-vinyl acetate copolymer DQDE–1868 was used to effect the bond had been subjected to a number of tension tests. In one test a strip twelve inches in length having a width sufficient to contain six strands of the rayon yarn material used for the filament reinforcing was gripped by the jaws of the tester. A number of samples of material without a seal were pulled until the maximum tension was passed which point was considered the strength or breaking point of the laminated material. The breaking tensions of a number of samples of reinforced material without the seal of the present invention containing six strands of filament reinforcing were tested and found to average sixty pounds break. A number of samples were tested which included the lapped seal of the present invention and were found to have breaking tensions that averaged forty-seven pounds. This amounts to a strength of 78% of that of the laminated material wherein no seal is present. Thus the seal of the present invention provides an extremely high strength seal which is readily applied and is not easily broken by tension. Further the overlapped seal of the present invention provides a hermetic seal which does not permit moisture or foreign matter to enter between the sheets of reinforced thermoplastic material.

While the foregoing disclosure and description of the invention is illustrative and explanatory thereof, other modifications will be apparent to those skilled in the art. Therefore the present invention is to be limited only in scope by the appended claims.

What is claimed is:

1. An overlap seal for securing two edges of one or more sheets of filament reinforced plastic material together comprising a plurality of bands of adhesive including one central band and one or more narrower bands on each side thereof, said adhesive having a melting point high enough so that sufficient heat is carried by the molten strands of said adhesive to cause said strands to bond effectively to the plastic sheets with the addition of pressure only, said adhesive being applied initially in a molten state between the overlapped portions of said two edges and bonded to said sheets by pressure only.

2. The seal of claim 1 wherein said sheets of plastic have at least their outer surfaces composed of polyethylene.

3. The seal of claim 1 wherein said central wide band is formed from two or more narrower bands that are merged into one by the application of said bonding pressure.

4. The seal of claim 1 wherein said adhesive is a hot melt adhesive.

5. The seal of claim 4 wherein said hot melt adhesive contains a solid ethylene-vinyl acetate copolymer as the major ingredient.

References Cited

UNITED STATES PATENTS

| | | | |
|---|---|---|---|
| 3,008,862 | 11/1961 | Haine et al. | 156—295 |
| 3,223,761 | 12/1965 | Raley | 264—95 |
| 3,232,789 | 2/1966 | Pelzek et al. | 117—138.8 |
| 3,419,641 | 12/1968 | Peterkin et al. | 156—327 |

LELAND A. SEBASTIAN, Primary Examiner

B. H. HUNT, Assistant Examiner

U.S. Cl. X.R.

156—157